3,780,136
PROCESS TO REDUCE THE AMOUNT OF LOW-MOLECULAR-WEIGHT AND AMORPHOUS POLYMERS FORMED DURING THE PREPARATION OF OLEFIN COPOLYMERS
Habet M. Khelghatian, Springfield, Pa., James L. Jezl, St. Charles, Ill., and Louise D. Hague, Wilmington, Del., assignors to Standard Oil Company, Chicago, Ill.
No Drawing. Filed Dec. 10, 1971, Ser. No. 206,943
Int. Cl. C08f 1/38, 1/44, 15/04
U.S. Cl. 260—878 B          4 Claims

ABSTRACT OF THE DISCLOSURE

Pretreating of a catalyst under polymerization conditions with a single olefin prior to its use for copolymerizing a mixture of olefins reduces the low-molecular-weight and amorphous material formed during the polymerization process.

SUMMARY OF THE INVENTION

This invention relates to a method of reducing low-molecular-weight and amorphous material formed during the preparation of alpha-olefin copolymers and more specifically it relates to a short contacting of the polymerization catalyst with a single alpha-olefin prior to the introduction of the second olefin for the copolymerization step or steps. The amount of reduction in low-molecular-weight and amorphous material is found to depend upon the percentage of the smaller-in-amount alpha-olefin polymerized and present in the total reaction product.

BACKGROUND OF THE INVENTION

It is well known that mixtures of alpha-olefins may be polymerized in the presence of catalysts comprised of a transition metal halide such as titanium (III) chloride in combination with an aluminum alkyl or alkyl aluminum halide, such as triethyl aluminum, diethyl aluminum chloride or ethyl aluminum dichloride in the presence of a coordinating compound such as $(RO)_4Si$, to form solid, crystalline copolymers having utility in the fabrication of shaped articles, films and fibers.

However, organoaluminum compound-transition metal halide catalyst combinations yield copolymers containing greater or lesser amounts of low-molecular-weight and amorphous components which, when taken alone, are viscous oils or soft, tacky solids. The presence of these alkane-soluble materials in the copolymer as formed leads to difficulties during fabrication and also to inferior physical properties of the finished item and hence they are almost always removed in commercial processes for the production of olefin copolymers.

In general, when the second alpha-olefin is added to the first during the polymerization process for the production of a copolymer either of the terminal-block type or of the multisegment type, the second or randomizing alpha-olefin, which is normally added in much smaller amount, goes preferentially into the alkane-soluble material. This preferential segregation of the second olefin into the alkane-soluble fraction leads to amounts of the second olefin in the alkane-insoluble portion of the copolymer predictable only by experience and in addition is wasteful of the second olefin. Additionally, since the amount of alkane-soluble material produced in a copolymerization is increased over that produced during polymerization of a single olefin, alkane-solubility is generally a greater problem in copolymer production. For these reasons then, reduction of the alkane-soluble fraction produced during the copolymerization process is even more economically valuable than its reduction during a homopolymerization process.

Now it has been found that by contacting a stereospecific polymerization catalyst with a single alpha-olefin prior to the copolymerization stage or stages, a substantial reduction of the alkane-soluble material can be obtained.

STATEMENT OF THE INVENTION

The herein described invention is usefully applied to any stereospecific catalyst system which produces crystalline poly-alpha-olefin. More preferably, it is used with catalysts which are comprised of Group IV-B halides and aluminum alkyls, alkyl aluminum halides or mixtures of aluminum alkyls and alkyl aluminum halides. Most preferably, the catalyst used in the invention is a mixture of activated titanium (III) chloride and ethyl aluminum dichloride and tetraethoxysilane.

The herein described invention may be usefully applied to produce either the terminal-block type of copolymer in which a single alpha-olefin is polymerized first followed by copolymerizing without venting the first alpha-olefin, a mixture of two or more alpha-olefins, or the multisegment type of copolymer wherein each segment is a mixture of two or more poly-alpha-olefins, one of which is present in substantially larger amount than the other or others in each segment.

The temperature of the aforementioned contacting step in which a single alpha-olefin is polymerized is not critical nor is the pressure of the alpha-olefin monomer, which is maintained above the catalyst surface. Polymerization temperatures of from 2 to 120° C. may be usefully applied and polymerization pressures of from 20 to 1000 or more p.s.i.g. of olefin are useful. Preferably, temperatures in the range from about 60 to about 80° C. are used and monomer pressures of between 30 and 300 p.s.i.g. are maintained.

The process of the instant invention is usefully applied to heterogeneous solvent polymerizations in which the catalyst system is slurried with solvent and then exposed to the olefin. The particular solvent used is not critical and is subject to considerable variation as long as it is stable and unreactive under the polymerization conditions employed. Alkanes such as pentane, hexane, heptane or cyclohexane are suitable as are hydrogenated aromatic compounds such as tetrahydronaphthalene or decahydronaphthalene. Halogenated hydrocarbons such as chloroalkanes, chlorobenzene, dichlorobenzene and chloronaphthalene, and alkaryls such as ethyl benzene and toluene are also useful.

The length of time of contacting the single olefin with the catalyst is not critical but in one embodiment (preparation of a multisegment copolymer) it is controlled such that the amount of homopolymer produced is not large enough to give a substantial amount of homopolymer in the final reaction product. The reaction time of, or alternatively, the amount of homopolymer formed during, the contacting in the multisegment embodiment is obtained for a particular set of catalyst, temperature and pressure conditions by polymerizing the olefin to just prior to the point where solid homopolymer would appear in the reaction mixture. Another way of expressing the extent of pretreatment is to end the polymerization of the single alpha-olefin, i.e., contacting, after about one (1) weight percent of the total amount of that olefin to be used is polymerized. For the terminal-block embodiment the reaction time of the contacting depends upon the length of homopolymer segment desired in the final polymer.

The olefins useful for this invention are alpha-olefins from 2 to about 10 carbon atoms. More preferably, an alpha-olefin of from 3 to about 10 carbon atoms is used in the contacting and a mixture of two alpha-olefins, each one having from 2 to about 10 carbon atoms is used for the copolymerization. Most preferably, propylene is used as the olefin in the contacting and also as the olefin polymerized in the larger amount in the copolymer segment or segments and ethylene is the second olefin which is copolymerized with propylene in the copolymer segment or segments.

The copolymers prepared in accordance with the invention can be extruded, mechanically melted, cast or molded as desired. They can be used to form plates, sheets, films, or a variety of molded objects which exhibit lower brittle temperatures than do the corresponding homopolymers. The products can be extruded in the form of pipe or tubing of excellent rigidity and can be injection molded into a great variety of articles. The copolymers can also be cold drawn into ribbons, bands, fibers or filaments of high elasticity and rigidity. Fibers of high strength can be spun from the molten copolymers obtained according to this process.

The invention is illustrated by, but not limited to, the following examples:

EXAMPLE I

Catalyst mixtures in the amounts shown below were made from diethyl aluminum chloride, $TiCl_3$ and diglyme and charged into a 5 gallon reactor. Three sets of separate experiments were run: the first run of each set involved polymerizing propylene first and then adding an ethylene-propylene mixture without venting the propylene and finishing the polymerization; the second run of each set involved polymerizing a mixture of ethylene and propylene and then finishing the run by polymerizing propylene alone. The low-molecular-weight and amorphous material produced in each run is the weight percentage of the total product that was found to be soluble in the pentane-hexane wash liquid. All experiments were run using hexane as the polymerization solvent.

TABLE I

Effect of order of polymerization of a terminal-block copolymer on alkane-solubles produced

| Mole percent ethylene in copolymer stage feed | First block | Second block | Alkane solubles (percent) |
|---|---|---|---|
| 6 | PP | CoP | 11 |
| 5 | CoP | PP | 13 |
| 13 | PP | CoP | 7 |
| 13 | CoP | PP | 10 |
| 23 | PP | CoP | 15 |
| 23 | CoP | PP | 26 |

Catalyst system: $Et_2AlCl$, $TiCl_3$, diglyme; Al/Ti/diglyme=2/1/0.03; $TiCl_3$ present to the extent of 0.035 grams/100 milliliters of polymerization solvent. Polymerization temperature is 160° F.

EXAMPLE II

Two different multisegment propylene-ethylene copolymers were made. For each the first run used the contacting of the instant invention and the other two used the conventional technique of starting the polymerization with propylene-rich propylene-ethylene comonomer mixture. The effect of the contacting as shown below in Table II is to reduce the alkane-solubles and to incorporate more of the lesser-in-amount comonomer, ethylene, in the alkane-insoluble fraction of each copolymer made.

TABLE II

Effect of pretreatment on the alkane-solubles produced during the polymerization of a multisegment polymer

| Al/Ti/Si, molar ratio | Al/Si, molar ratio | Variable | Alkane-solubles | Alkane-insoluble product, percent ethylene | | |
|---|---|---|---|---|---|---|
| | | | | Total | $(C_2)_1$[b] | $(C_2)>_1$[b] |
| 1.6/1/0.46 | 3.5/1 | $C_3$ first | 19.4 | 5.3 | 4.3 | 1.0 |
| 1.6/1/0.46 [a] | 3.5/1 | $C_2$–$C_3$ first | 26.5 | 5.4 | 4.3 | 1.1 |
| 1.6/1/0.46 | 3.5/1 | do | 26.8 | 5.7 | 4.6 | 1.1 |
| 1.6/1/0.64 | 2.5/1 | $C_3$ first | 23.1 | 5.2 | 4.1 | 1.1 |
| 1.2/1/0.48 | 2.5/1 | $C_2$–$C_3$ first | 25.0 | 4.2 | 3.7 | 0.5 |

[a] AA $TiCl_3$ was 0.1 grams/100 milliliters of hexane solvent.
[b] Weight percent ethylene present in the pentane-hexane insoluble copolymer as single units $(C_2)_1$ and as pairs or greater $(C_2)>_1$ as determined by infrared analysis of films of the copolymer.
Catalyst system: $EtAlCl_2$, $(EtO)_4Si$. Amount of AA $TiCl_3$ was 0.08 grams/100 milliliters of hexane solvent. Polymerization temperature was 130° F.

What is claimed is:

1. In the prepaartion of a normally solid, crystalline, multisegment-type, alpha-olefin copolymer employing a catalyst comprising titanium chloride and an organoaluminum compound by polymerizing a mixture of two monomers, said mixture containing a first monomer present at all times in substantially larger amount than the second monomer and said mixture being constantly replenished in said first monomer and periodically replenished in said second monomer, the improvement which comprises the step of contacting said catalyst with said first monomer under polymerizing conditions prior to addition of said mixture.

2. The improved process of claim 1 wherein said first monomer is propylene and said second monomer is ethylene.

3. The improved process of claim 1 wherein the amount of said first monomer polymerized in said step is about one (1) weight percent of the total amount of said first monomer to be incorporated in said polymer.

4. The improved process of claim 2 wherein the amount of said first monomer polymerized in said step is about one (1) weight percent of the total amount of said first monomer to be incorporated in said copolymer.

References Cited

UNITED STATES PATENTS

| | | | |
|---|---|---|---|
| 3,268,624 | 8/1966 | Jezl et al. | 260—878 B |
| 3,404,096 | 10/1968 | Lamborn | 260—878 B |
| 3,208,985 | 9/1965 | Piekarski et al. | 260—94.9 C |
| 3,219,648 | 11/1965 | Hill | 260—94.9 C |
| 3,219,652 | 11/1965 | Hill et al. | 260—94.9 C |
| 3,296,338 | 1/1967 | Jezl et al. | 260—94.9 C |
| 3,442,978 | 5/1969 | Khelghatian et al. | 260—878 B |

FOREIGN PATENTS

| | | | |
|---|---|---|---|
| 979,123 | 1/1965 | Great Britain | 260—94.9 B |

JOSEPH L. SCHOFER, Primary Examiner

A. HOLLER, Assistant Examiner

U.S. Cl. X.R.

260—88.2 R, 94.9 B, 94.9 C

UNITED STATES PATENT OFFICE
CERTIFICATE OF CORRECTION

Patent No. 3,780,136                    Dated December 18, 1973

Inventor(s) Habet M. Khelghatian; James L. Jezl; and Louise D. Hague

It is certified that error appears in the above-identified patent and that said Letters Patent are hereby corrected as shown below:

Column 4, line 14, change $EtAlCl_3$ to $EtAlCl_2$

Column 4, line 14, after $EtAlCl_2$ (after correcting to above) insert . AA $TiCl_3$ which has been omitted.

Column 4, line 37, last word should be copolymer in place of polymer.

Signed and sealed this 6th day of August 1974.

(SEAL)
Attest:

McCOY M. GIBSON, JR.             C. MARSHALL DANN
Attesting Officer                Commissioner of Patents